(12) United States Patent
Elmegreen et al.

(10) Patent No.: US 11,442,184 B2
(45) Date of Patent: Sep. 13, 2022

(54) INFRASONIC DETECTION USING A PARALLEL DIPOLE LINE TRAP

(71) Applicant: International Business Machines Corporation, Armonk, NY (US)

(72) Inventors: Bruce Gordon Elmegreen, Goldens Bridge, NY (US); Oki Gunawan, Westwood, NJ (US); Wang Zhou, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 16/811,323

(22) Filed: Mar. 6, 2020

(65) Prior Publication Data
US 2021/0278556 A1 Sep. 9, 2021

(51) Int. Cl.
*G01V 1/18* (2006.01)
(52) U.S. Cl.
CPC .................. *G01V 1/183* (2013.01)
(58) Field of Classification Search
CPC .................. G01V 1/183; G01H 11/02
See application file for complete search history.

(56) References Cited

U.S. PATENT DOCUMENTS

| | | | |
|---|---|---|---|
| 8,895,355 B2 | 11/2014 | Cao et al. | |
| 9,072,496 B2 | 7/2015 | Rao et al. | |
| 9,093,377 B2 | 7/2015 | Cao et al. | |
| 9,236,293 B2 | 1/2016 | Cao et al. | |
| 9,263,669 B2 | 2/2016 | Cao et al. | |
| 9,424,971 B2 | 8/2016 | Cao et al. | |
| 9,772,385 B2 | 9/2017 | Gunawan et al. | |
| 9,978,493 B2 | 5/2018 | Gunawan | |
| 10,031,058 B2 * | 7/2018 | Gunawan | G01N 27/00 |
| 10,128,013 B1 * | 11/2018 | Gunawan | G21K 1/006 |
| 10,222,350 B2 | 3/2019 | Gunawan | |
| 10,585,026 B2 * | 3/2020 | Gunawan | G01N 11/16 |
| 10,627,330 B2 * | 4/2020 | Gunawan | G01N 11/16 |
| 2017/0045433 A1 * | 2/2017 | Gunawan | G01N 27/00 |
| 2018/0299581 A1 * | 10/2018 | Gunawan | G01V 7/04 |
| 2020/0286655 A1 * | 9/2020 | Gunawan | H01L 31/02024 |
| 2021/0278556 A1 * | 9/2021 | Elmegreen | G01H 11/02 |

OTHER PUBLICATIONS

Gunawan et al., "A Diamagnetic Trap with 1D Camelback Potential", arXiv preprint arXiv:1405.5220, 2014, pp. 1-5.
Gunawan et al., "A parallel dipole line system", Applied Physics Letters 106, 2015, pp. 1-23.
Gunawan et al., "The one-dimensional camelback potential in the parallel dipole line trap: Stability conditions and fiite size effect", Journal of Applied Physics, 121, No. 13, 2017, pp. 1-10.

* cited by examiner

*Primary Examiner* — Daniel Pihulic
(74) *Attorney, Agent, or Firm* — Cantor Colburn LLP; Joseph Petrokaitis (57) ABSTRACT

Aspects of the invention include arranging two cylindrical magnets with transverse magnetization to be parallel to each other along their longitudinal axis. The two cylindrical magnets have a space between them and are prevented from moving relative to one another. An exemplary method includes disposing a diamagnetic object to levitate above the space between the two cylindrical magnets. A motion detector is arranged to identify relative movement between the two cylindrical magnets and the object, and an infrasound wave is identified based on the relative movement.

20 Claims, 9 Drawing Sheets

INFRASONIC DETECTION USING A PARALLEL DIPOLE LINE TRAP

BACKGROUND

The present invention generally relates to infrasonic detectors and, more specifically, to infrasonic detectors configured and arranged to use a parallel dipole line trap system.

Infrasonic (i.e., infrasound) detectors are devices or systems that can detect sound waves with a frequency below 20 Hertz (Hz), the typical lower limit of human hearing. Large animals like elephants can hear and emit infrasound and can communicate using infrasound. Many natural phenomena (e.g., thunderstorms, large meteors, landslides, ocean waves reaching shore) emit infrasound. Infrasound can propagate over a long distance (e.g., several hundred miles or more) depending on weather conditions.

SUMMARY

Embodiments of the present invention are directed to infrasonic detection using a parallel dipole line trap device. A non-limiting example method of assembling an infrasound detection system includes a method of assembling an infrasonic detection system. The method includes arranging two cylindrical magnets with transverse magnetization to be parallel to each other along their longitudinal axis. The two cylindrical magnets have a space between them and are prevented from moving relative to one another. The method also includes disposing a diamagnetic object in the space between the two cylindrical magnets. The object levitates above the space. A motion detector is arranged to identify relative movement between the two cylindrical magnets and the object, and an infrasound wave is identified based on the relative movement.

Other embodiments of the present invention implement the system obtained by the above-described method for infrasound detection.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 1A and 1B depict different views of an exemplary parallel dipole line (PDL) trap system in accordance with aspects of the invention, in which:

FIGS. 2A and 2B are block diagrams of an exemplary PDL trap system used for infrasonic detection according to an exemplary embodiment of the invention, in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, infrasound is below 20 Hz and can travel long distances. Infrasound detection can facilitate the detection of natural phenomena (e.g., thunder, meteors, natural disasters), man-made activity (e.g., the movement of structures, wind farms, traffic, aircraft), animals, and the operation of machines, for example. However, infrasound is undetectable by typical acoustic detectors.

One or more embodiments of the present invention provide infrasound detection using a parallel dipole line (PDL) trap device. Infrasonic detection and infrasound detection are used interchangeably herein. As detailed, the PDL trap system exhibits decoupling between a pair of cylindrical magnets and a diamagnetic object (e.g., graphite rod) trapped by the magnetization of the magnets. Thus, relative motion between the cylindrical magnets and the trapped object provides information about the source of the movement. According to one or more exemplary embodiments of the invention, the PDL trap system is arranged such that infrasound waves disturb the cylindrical magnets but not the trapped object. According to one or more other exemplary embodiments of the invention, the PDL trap system is arranged such that infrasound waves disturb the trapped object but not the cylindrical magnets. In either case, measurement of the relative movement between the pair of cylindrical magnets and the trapped object is used to detect the infrasound. Exemplary embodiments of the invention facilitate determination of the direction of the infrasound. Exemplary embodiments of the invention also facilitate tuning of the PDL trap system to maximize sensitivity to a particular infrasound frequency.

Figure 1A:
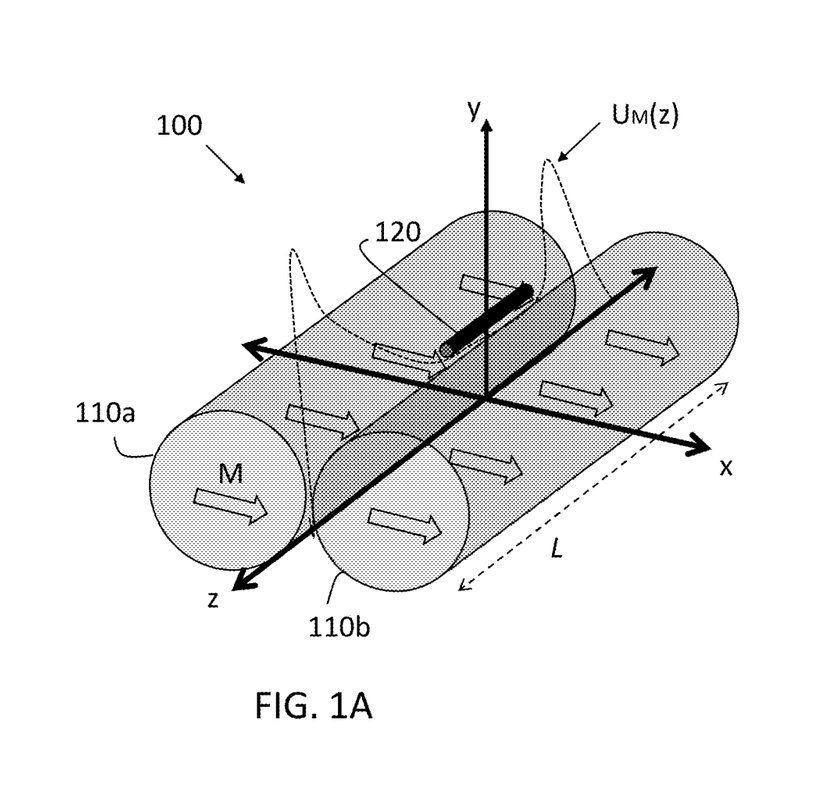
FIG. 1A depicts an isometric view of the PDL trap system.
Figure 1B:
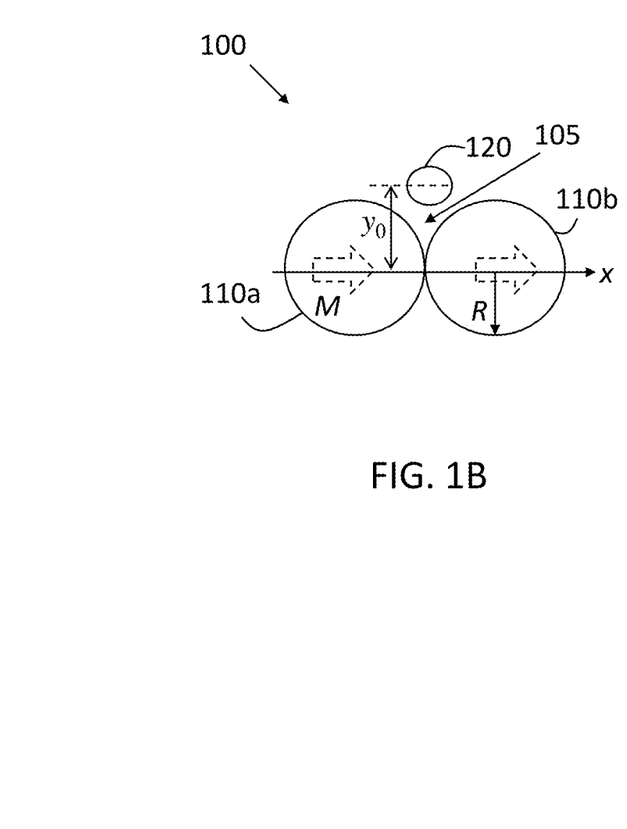
FIG. 1B depicts a front view of the PDL trap system.

Turning now to FIGS. 1A and 1B, a PDL trap system 100 in accordance with one or more embodiments of the present invention is shown. FIG. 1A shows an isometric view of the PDL trap system 100. As shown, the PDL trap system 100 includes two cylindrical magnets 110a and 110b (generally referred to as 110). The length L of the cylindrical magnets 110 is indicated. The cylindrical magnets 110 have transverse magnetization and are parallel to each other along their longitudinal axis (i.e., along length L). A trapped object 120 levitates above the cylindrical magnets 110. The magnetization M of the cylindrical magnets 110 is also indicated and is uniform over their length. The camelback-shaped magnetic potential energy $U_M(z)$ indicated in FIG. 1A traps the object 120 at its minimum potential. This camelback-shaped magnetic potential energy is achieved when, for a given length of the object 120, the length L of the cylindrical magnets 110 is greater than a critical length $L_C$. The critical length $L_C$ is determined as:

$$L_C = 2\sqrt{4R^2 - y_0^2} \qquad [\text{EQ. 1}]$$

In EQ. 1, R is the radius of the cylindrical magnets 110 and $y_0$ is the levitation height of the trapped object 120, as indicated in FIG. 1B.

FIG. 1B shows a front view of the PDL trap system 100. The radius R of the cylindrical magnets 110 is indicated. The decoupling of the object 120 from the cylindrical magnets 110 is clearly apparent in the view shown in FIG. 1B, which shows the object 120 levitating above the space 105 between the cylindrical magnets 110. The object 120 can be a graphite rod, for example, but can be another diamagnetic material. The camelback shape of the magnetic potential energy shown in FIG. 1A traps the object 120 at the minimum potential, as shown. This allows the object 120 to levitate, decoupled from the cylindrical magnets 110. This decoupling facilitates the use of the PDL trap system 100 as an infrasonic sensor, as detailed.

Because the object 120 is decoupled from the cylindrical magnets 110, an infrasonic signal that is directed at the cylindrical magnets 110 will move the cylindrical magnets 110 but not the object 120. Similarly, an infrasonic signal that is directed at the object 120 will move the object 120 but not the cylindrical magnets 110. Thus, a determination of relative movement between the cylindrical magnets 110 and the object 120 can be used to detect the infrasonic signal. The natural frequency (i.e., the frequency to which the PDL trap system 100 is most sensitive) can be controlled by controlling the magnet aspect ratio (L/R) of the cylindrical magnets 110. Any detector that can detect the relative movement between the cylindrical magnets 110 and the object 120 can be used to identify infrasonic waves.

Figure 6:
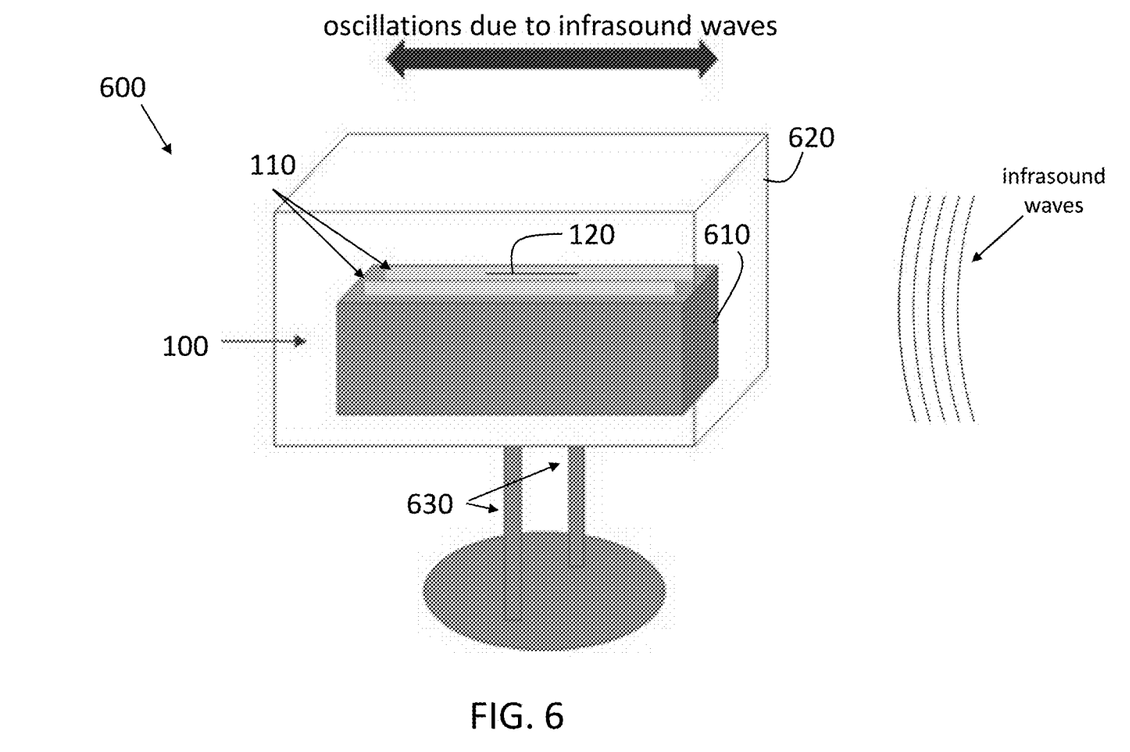
FIG. 6 depicts a PDL trap system used for infrasonic detection according to an exemplary embodiment of the invention.

Thus, infrasonic detection using a PDL trap system 100 requires a way to target either the cylindrical magnets 110 or the object 120 with the sound waves. Exemplary directors include a funnel 220 (FIG. 2), a diaphragm 410 (FIG. 4), and an enclosure 620 on flexible spindles 630 (FIG. 6). Infrasonic detection using the PDL trap system 100 also requires a motion detector to detect and measure the relative movement between the cylindrical magnets 110 and the object 120. An exemplary motion detector is discussed with reference to FIG. 2B. However, as previously noted, alternate embodiments of the invention can use other motion detectors. A set of PDL trap systems 100 can be arranged in an array as an interferometer to facilitate infrasonic detection with directional sensitivity, as discussed with reference to FIG. 4.

Optionally, infrasonic detection using the PDL trap system 100 can include a device that captures, direct, or focuses infrasonic sound waves for detection. Exemplary optional devices include a reflecting device 710 (FIG. 7), large surfaces 810 (FIG. 8), and tube 910 (FIG. 9). As another option, a reference PDL trap system 100 can be used with any of the exemplary embodiments of the invention that are discussed herein. The reference PDL trap system 100 has a motion detector but no additional features (e.g., infrasonic director or device that captures or focuses infrasonic sound waves for detection). As such, the reference PDL trap system 100 detects background oscillations that are not related to infrasound.

Infrasonic detection with one or more PDL trap systems 100, according to exemplary embodiments of the invention detailed with reference to FIGS. 2-9, has countless applications. The examples noted herein are not intended to be limiting. Natural events (e.g., thunder, wind, waterfalls, upper atmospheric disturbances, aurora, large meteors, waves, tremors, earthquakes, landslides, avalanches, fracturing icebergs, tornados, volcanic eruptions) can be detected from hundreds of miles away. Windfarms and movements of structures such as buildings can be detected and monitored, as well. Traffic, aircraft, trains, motion and vocalization of large mammals such as elephants or herds of smaller animals can also be detected. Launches of space craft or machine operation can also be detected from afar.

Figure 2A:
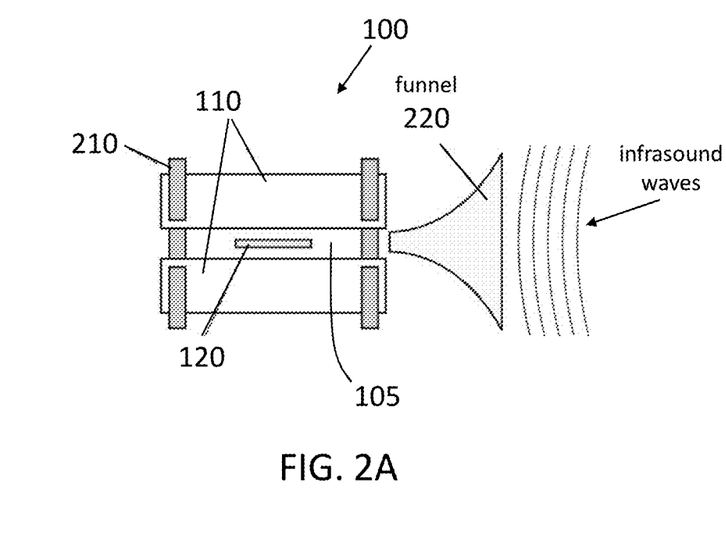
FIG. 2A is a top-down view of the exemplary PDL trap system.
Figure 2B:
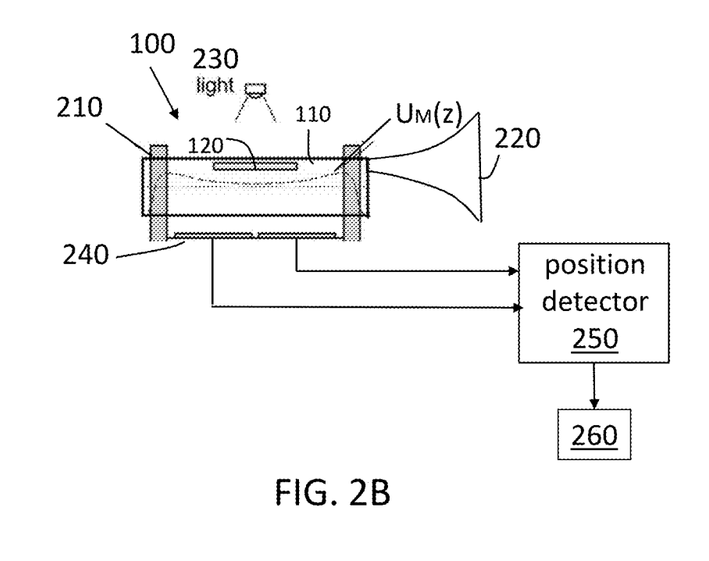
FIG. 2B is a side view of the exemplary PDL trap system.

FIGS. 2A and 2B are block diagrams of a PDL trap system 100 used for infrasonic detection according to an exemplary embodiment of the invention. FIG. 2A is a top-down view showing the cylindrical magnets 110 held together by a fixture 210. The object 120 levitates above the space 105 between the cylindrical magnets 110. A funnel 220 channels infrasound waves to the object 120, as shown. The varying pressure surrounding the object 120 due to the infrasound waves causes movement of the object 120 but not of the cylindrical magnets 110 that are held in place by the fixture 210 on either side of the space 105. The PDL trap system 100 according to the exemplary embodiment of the invention shown in FIG. 2A has a high pass response. That is, infrasound with frequencies higher than the natural frequency of the PDL trap system 100 will be detected.

FIG. 2B is a side view of the PDL trap system 100 shown in FIG. 2A and also includes an exemplary motion detector. One of the cylindrical magnets 110 is visible in the side view shown in FIG. 2B. The object 120, which is behind the visible cylindrical magnet 110 according to the side view shown in FIG. 2B, is indicated for explanatory purposes and is shown above the camelback-shaped magnetic potential energy $U_M(z)$. The exemplary motion detector used to detect movement of the object 120 includes a light 230 cast onto the object 120 from above the object 120. The exemplary motion detector also includes light sensing material such as the split photodetectors 240 below the cylindrical magnets 110 and a position detector 250. Based on the light 230 and on the movement of the object 120, the relative length of shadows on each of the two photodetectors 240 can be used by the position detector 250 to detect the displacement of the object 120 from the center. Any relative displacement of the object 120 (relative to the cylindrical magnets 110) indicates the presence of the infrasound wave. The frequency, phase and amplitude of the relative displacement of the object 120 in response to the sound wave will be related to the frequency, phase and amplitude of the sound wave, permitting measurements of the sound wave properties. For example, Fourier transform of the displacement signal is related to the frequency spectrum of detected infrasonic waves. The position detector 250 can be part of or, as shown in FIG. 2B, provide information to a processing system 260 regarding the infrasonic waves.

While the exemplary motion detector shown in FIG. 2B includes a light 230, photodetectors 240, and a position detector 250, this example is not intended to limit other known ways of determining relative movement between the cylindrical magnets 110 and object 120 as a way to detect infrasound waves. As another example, a capacitive sleeve can be used. The capacitive sleeve can be attached to the cylindrical magnets 110 (e.g., to the fixture 210) such that the object 120 levitates within the capacitive sleeve. Movement of the object 120 within the sleeve can be identified based on changes in the capacitance of the capacitive sleeve due to the motion of the trapped object 120.

Figure 3:
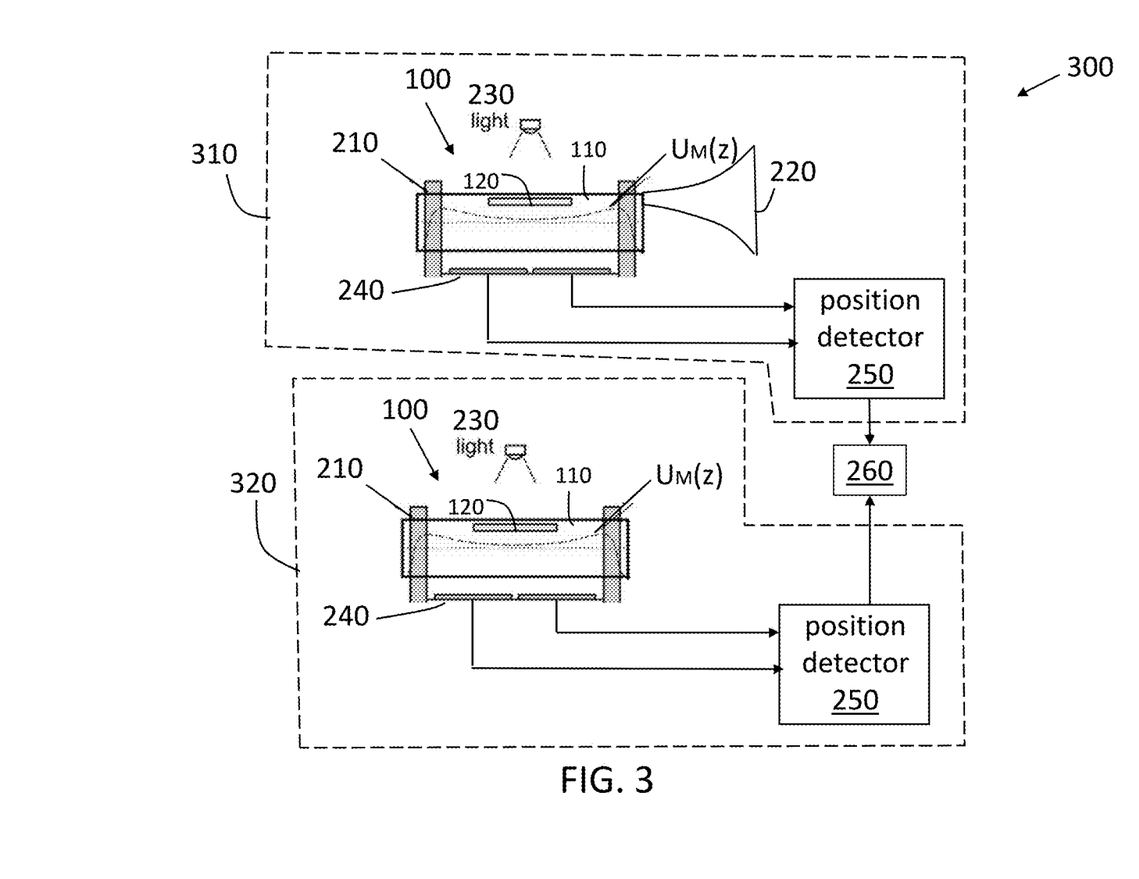
FIG. 3 is a block diagram of an infrasonic detection system that includes an infrasound detection system and a reference system according to an exemplary embodiment of the invention.

FIG. 3 is a block diagram of an infrasonic detection system 300 according to an exemplary embodiment of the invention. The infrasonic detection system 300 includes both an infrasound detection system 310 and a reference detection system 320. As previously noted, a reference PDL trap system 100 can be used in conjunction with the PDL trap system 100. The side view of an infrasound detection system 310 is shown in FIG. 3. The PDL trap system 100 of the infrasound detection system 310 is identical to that shown in FIG. 2B. Thus, a funnel 220 is shown to direct infrasound waves, as in FIG. 2B.

The reference detection system 320 is also shown in FIG. 3. The reference detection system 320 includes a reference PDL trap system 100 and a motion detection portion. That is, the reference detection system 320 includes the light 230, photodetectors 240, and position detector 250 that are also used with the infrasound-detecting PDL trap system 100, as shown. However, the reference detection system 320 does not include the funnel 220. As such, the reference detection system 320 is used to detect background oscillations not related to the infrasound waves detected by the infrasound detection system 310. The processing system 260 can extract the differential signal between the result provided by the reference detection system 320 and the result provided by the infrasound detection system 310 to obtain a cleaner detection of the infrasonic wave.

Figure 4:
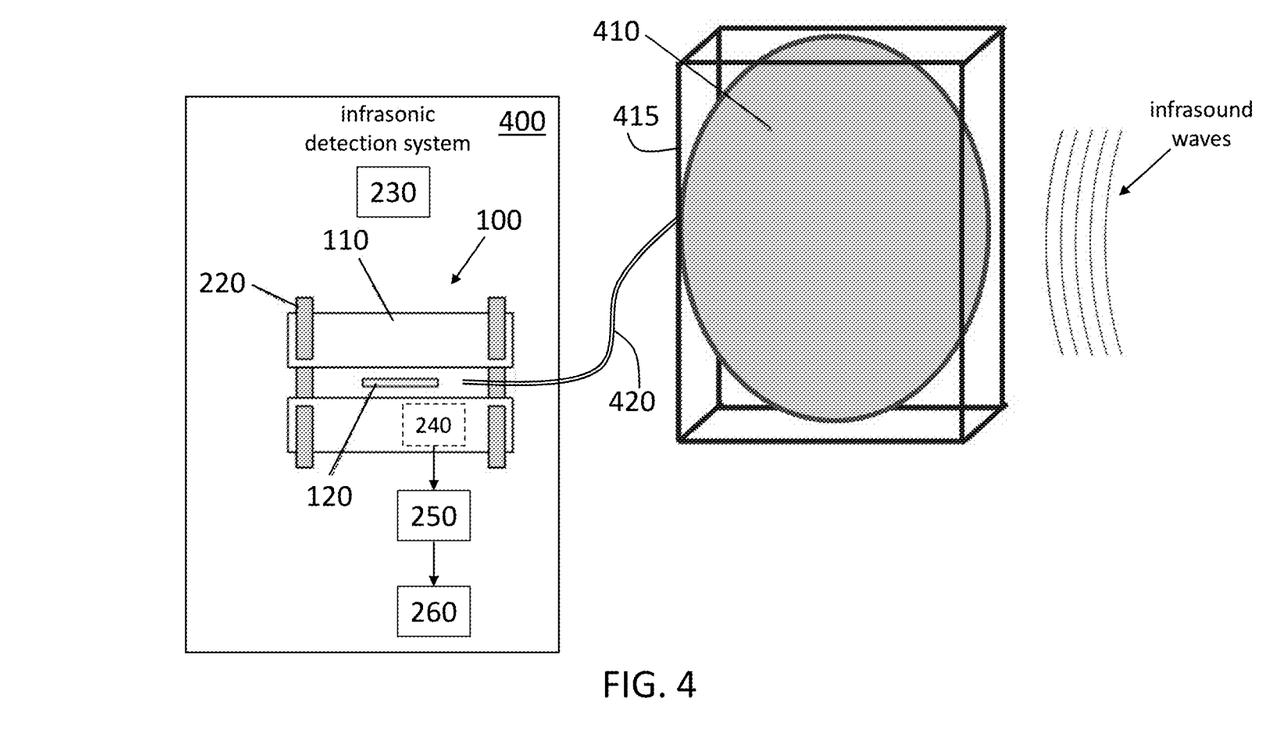
FIG. 4 shows an exemplary infrasonic detection system that includes a PDL trap system and a diaphragm according to an exemplary embodiment of the invention.

FIG. 4 depicts a PDL trap system 100 used for infrasonic detection according to an exemplary embodiment of the invention. A top-down block diagram is shown of an infrasonic detection system 400. The infrasonic detection system 400 includes the PDL trap system 100 and the exemplary motion detection components detailed in FIG. 2B. Specifically, the exemplary motion detection components of the infrasonic detection system 400 include a light 230, photodetectors 240, and a position detector 250, which may be part of or may provide information to a processing system 260. A diaphragm 410 is used to direct air onto the object 120 through a tube 420. The diaphragm 410 can be soft-sided and arranged in a supporting frame 415. The diaphragm 410 breathes in and out as long-wavelength sound waves (i.e., infrasound waves) pass by. As the volume of the diaphragm 410 changes in this way, the air moves in and out of the tube 420, which is arranged to blow air on the object 120. This is similar to the funnel 220 (FIG. 2), which directs infrasound waves onto the object 120, but the diaphragm 410 additionally amplifies the force of the infrasound waves.

Figure 5:
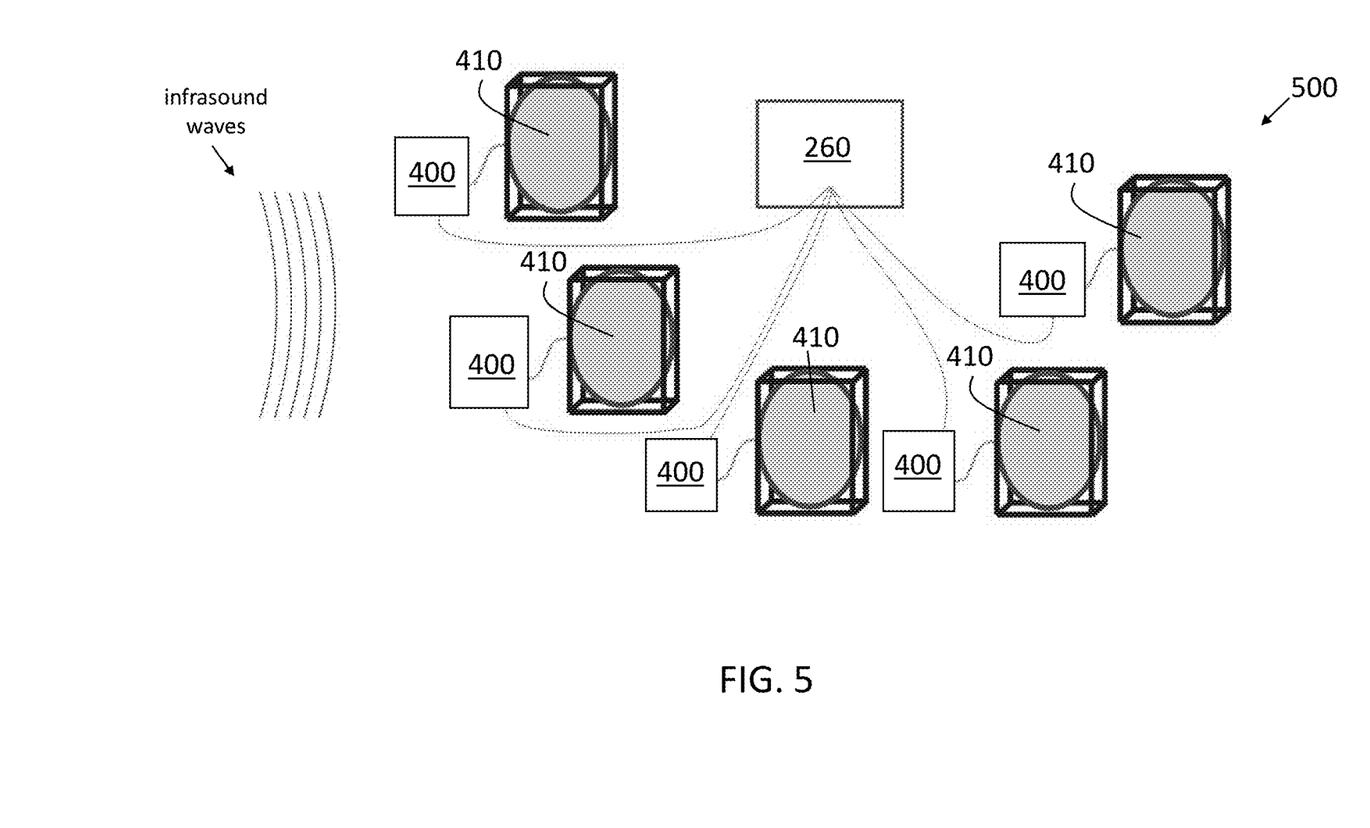
FIG. 5 depicts an array of the exemplary infrasonic detection systems shown in FIG. 4.

FIG. 5 shows an array 500 of PDL trap systems 100 used for infrasound interferometry according to one or more embodiments of the invention. Each PDL trap system 100 of the array 500 is part of an infrasonic detection system 400 and is supplied with air by a diaphragm 410, as detailed with reference to FIG. 4. Each of the infrasonic detection systems 400 may be separated by hundreds of miles, and the output of each position detector 260 may be provided to a central processing system 260. The output can be provided wirelessly although physical connections are shown for explanatory purposes. The processing system 260 can perform cross correlation and interferometry. Specifically, phase differences between pairs of outputs of position detectors are used, as is generally the case in interferometry, to determine the direction from which infrasound waves are coming. For example, if a particular phase of the infrasound wave is detected at a first infrasonic detection system 400 before a second infrasonic detection system 400 in a given pair, then the infrasound wave is determined to be moving in a direction from the first to the second infrasonic detection system 400.

FIG. 6 depicts a PDL trap system 100 used for infrasonic detection according to an exemplary embodiment of the invention. The infrasound detection system 600, according to the exemplary embodiment of the invention, includes the PDL trap system 100. The cylindrical magnets 110 are held together by a support structure 610, and the object 120 levitates above the cylindrical magnets 110. The support structure 610, like the fixture 210 (FIG. 2), is an implement that prevents relative motion between the cylindrical magnets 110. The enclosure 620 of the PDL trap system 100 maintains a vacuum. This vacuum-sealed enclosure 620 with the PDL trap system 100 inside is supported on spindles 630. While two spindles 630 are shown, the exemplary number is not intended to be limiting. Unlike the embodiments discussed with reference to FIGS. 2-5, the present embodiment involves movement of the cylindrical magnets 110, rather than of the object 120, based on infrasound waves.

Specifically, infrasound waves cause one-dimensional oscillation of the enclosure 620 and the spindles 630, which are flexible and attached to a rigid base, as shown. This, in turn, results in oscillation of the support structure 610 and the cylindrical magnets 110. The object 120 that levitates above the cylindrical magnets 110 is not directly affected by the infrasound waves. As a result, infrasound waves cause movement of the cylindrical magnets 110 relative to the object 120. When the cylindrical magnets 110 and the spindles 630 are arranged, as shown, relative to the incoming infrasound waves, the force of the infrasound waves on the cylindrical magnets 110 is maximized. If, instead, the cylindrical magnets 110 and spindles 630 were perpendicular to the position shown in FIG. 6, the infrasound waves would act on one side of the pair of cylindrical magnets 110 and the pair of spindles 630 and the force would be minimal.

Although not shown, the movement of the cylindrical magnets 110 relative to the object 120 can be measured using the previously discussed or other known techniques. For example, the light 230, photodetectors 240, and position detector 250 discussed with reference to FIG. 2 can be used. In this case, the cause of the movement in the shadows on the photodetectors 240 will be movement of the cylindrical magnets 110 rather than movement of the object 120. As another example, the previously discussed capacitive sleeve can be used. In this case, the sleeve that is attached to the support structure 610 will move rather than the object 120 within it.

Figure 7:
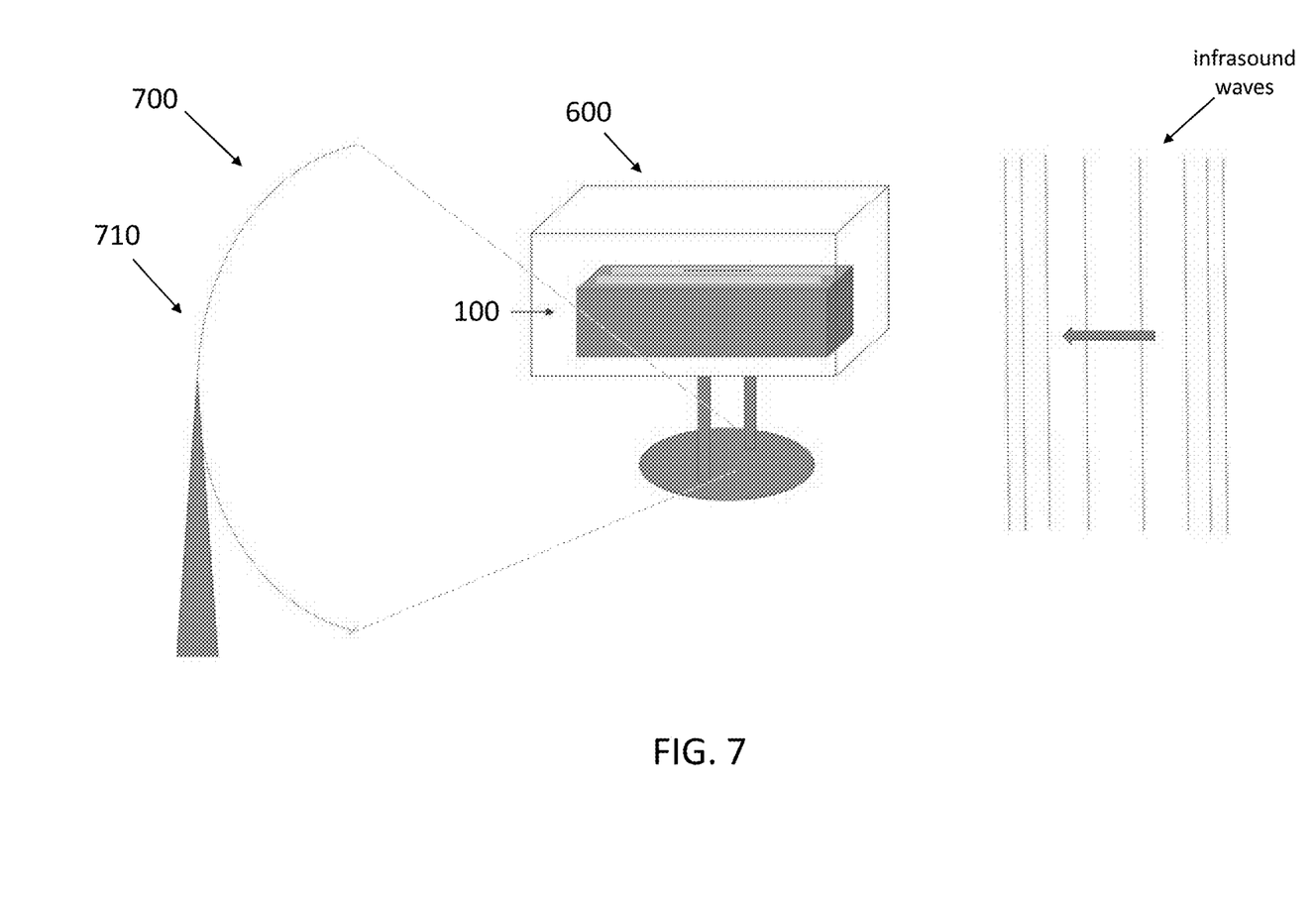
FIG. 7 depicts the PDL trap system used for infrasonic detection, as shown in FIG. 6, with a reflecting device according to one or more embodiments of the invention.

FIG. 7 depicts a PDL trap system 100 used for infrasonic detection according to an exemplary embodiment of the invention. The infrasound detection system 700, according to the exemplary embodiment of the invention, includes the infrasound detection system 600 (FIG. 6) and a reflecting device 710. The infrasound waves can have a frequency on the order of 1 Hz such that the wavelength is on the order of 300 meters (m) and the range is on the order of 100 kilometers (km) to 1000 km. The reflecting device 710 focuses the infrasound waves from a distant source (e.g., 100 km away) onto the infrasound detection system 600, as shown, to improve the response of the infrasound detection system 600.

While the exemplary reflecting device 710 shown in FIG. 7 is a parabolic reflector, the reflecting device 710 can be a natural structure such as a concave rock structure or a shear-rock cliff. The cross-section of the reflecting device 710 can be on the order of 100 m. The reflecting device 710 can be steerable and, thus, facilitates determining a direction of the infrasound waves. This is because the amount of energy collected and focused by the reflecting device 710 will be maximized when the reflecting device 710 is aligned with the source of the infrasound waves. Diffraction of the sound waves will limit the directionality of the response if the wavelength of the sound waves is comparable to or larger than the size of the reflector.

Figure 8:
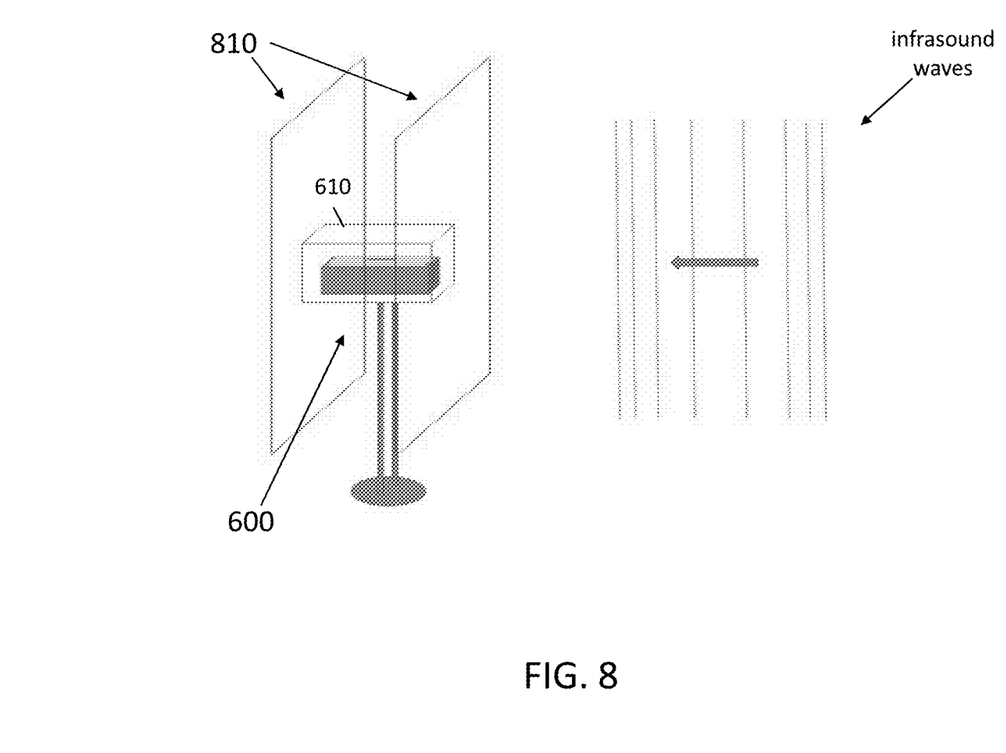
FIG. 8 depicts the PDL trap system used for infrasonic detection, as shown in FIG. 6, with large surfaces according to one or more embodiments of the invention.
Figure 9:
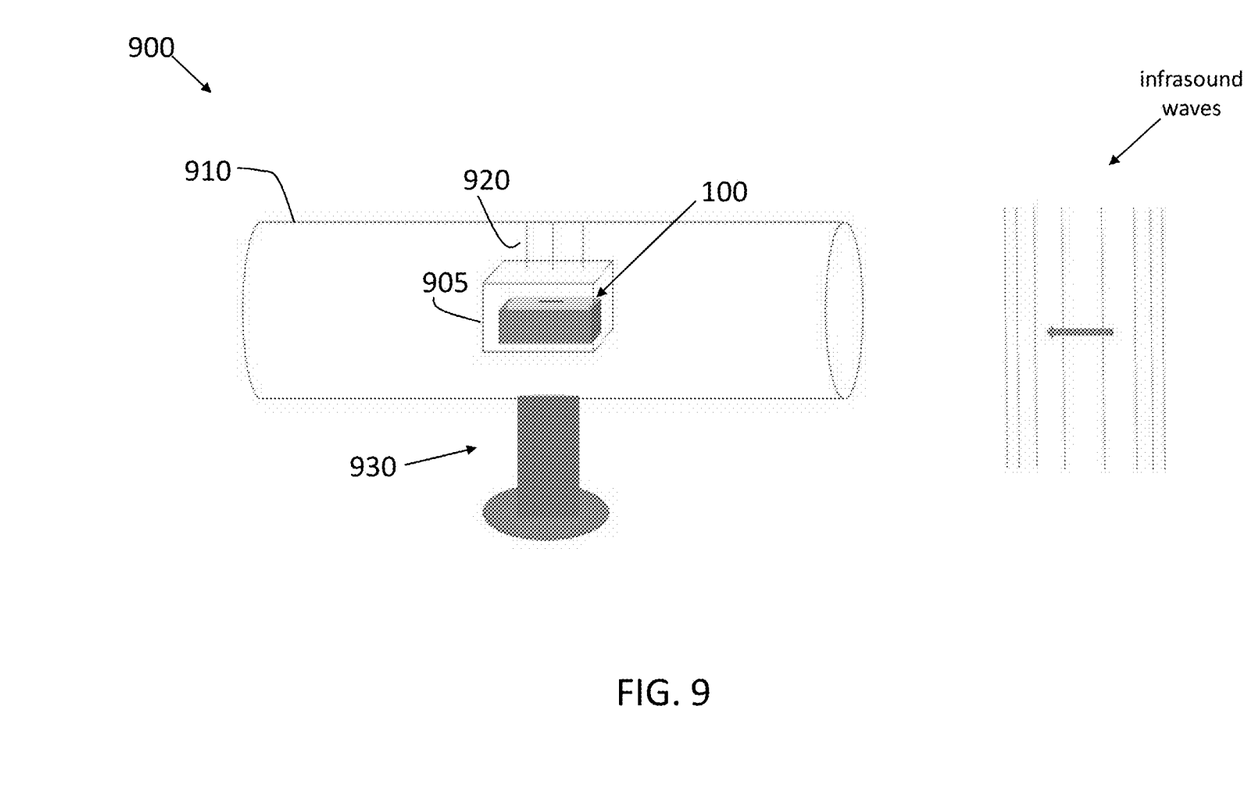
FIG. 9 depicts an infrasound detection system that includes a PDL trap system in an open-ended tube according to one or more embodiments of the invention.

FIG. 8 depicts a PDL trap system 100 used for infrasonic detection according to an exemplary embodiment of the invention. The infrasound detection system 800, according to the exemplary embodiment of the invention, includes the infrasound detection system 600 (FIG. 6) and two large surfaces 810 (e.g., fins) affixed to opposite sides of the infrasound detection system 600, as shown. The large surfaces 810 can be any lightweight material such as a polymer or cloth stretched on struts with thin wires. When the infrasound waves impinge on the large cross section of the large surfaces 810, a force is transmitted to the infrasound detection system 600. This force is much greater than the force of the infrasound waves without the amplifying effect of the large surfaces 810 when the large surfaces 810 are affixed to the enclosure 620 at the longitudinal ends of the cylindrical magnets 110 and alignment of the infrasound waves is as shown in FIG. 8. As noted in the discussion of FIG. 6, the diamagnetic object 120 is not directly affected by the force and, thus, the cylindrical magnets 110 of the infrasound detection system 600 move relative to the object 120. A motion detection device to identify and measure this relative motion is not shown in FIG. 8.

FIG. 9 depicts a PDL trap system 100 used for infrasonic detection according to an exemplary embodiment of the invention. The infrasound detection system 900, according to the exemplary embodiment of the invention, includes the PDL trap system 100 in a vacuum-sealed enclosure 905, similar to the infrasound detection system 600 (FIG. 6). However, instead of being mounted on a base with spindles 630, the enclosure 905 is suspended within an open-ended tube 910 by flexible supports 920. The flexible supports 920 can be threads, wires, and the like. Infrasound waves that enter the tube 910 cause oscillation of the enclosure 905 that is facilitated by the flexibility of the supports 920. The movement of the enclosure 905 causes movement of the cylindrical magnets 110 of the PDL trap system 100 but does not directly affect movement of the object 120 that levitates above. As discussed with reference to previous exemplary embodiments, a motion detector can be used to identify and measure the relative motion between the cylindrical magnets 110 and the object 120 in order to detect the infrasound waves.

The tube 910 is shown on a solid base 930 that is not flexible like the spindles 630 but can swivel according to exemplary embodiments. The tube 910 and, more specifically, the fact that infrasound waves have maximum effect on the enclosure 905 within the tube 910 only when the infrasound waves align with the opening of the tube 910, gives the infrasound detection system 900 directionality. Thus, the ability to swivel the infrasound detection system 900 can facilitate determining the direction of infrasound waves by determining the swivel position at which the detection by the infrasound detection system 900 is maximized. Direction detection is most effective for tubes that are long compared to the infrasound wavelength, otherwise, the pressure from the sound wave will be nearly the same on each side of the tube and the net force on the enclosure will be small.

For explanatory purposes, the discussion of FIGS. 6-9 has focused on the movement of the cylindrical magnets 110 based directly on the infrasound waves. However, movement of the cylindrical magnets 110 then causes movement of the object 120, as well. In the infrasound detection system 900, the length of the supports 920 is selected to ensure that the oscillation frequency of the enclosure 905 (swinging by the supports 920, essentially) matches the oscillation frequency of the object 120. For example, 0.25 m supports 920 produce an oscillation frequency (cycles per second) of 1 Hz. The tube 910 can be 20 m or longer in length for directionality at infrasound frequencies (cycles per second) of 20 Hz or less. An infrasound wave that enters the tube 910 as a 1 Hz compressive wave results in a 1 Hz oscillation period. Because of the eventual movement of both the cylindrical magnets 110 and the object 120 over the integration period (e.g., minutes to hours) used for infrasound detection, a transfer function instrumentation response can be used to determine the excitation signal (i.e., the infrasound wave).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of assembling an infrasonic detection system, the method comprising:
   arranging two cylindrical magnets with transverse magnetization to be parallel to each other along their longitudinal axis, wherein the two cylindrical magnets have a space between them and are prevented from moving relative to one another;
   disposing a diamagnetic object to levitate above the space between the two cylindrical magnets;
   arranging a motion detector to identify relative movement between the two cylindrical magnets and the object; and
   identifying an infrasound wave based on the relative movement.

2. The method according to claim 1 further comprising positioning a funnel to direct the infrasound wave to the object levitating above the space between the two cylindrical magnets.

3. The method according to claim 1 further comprising positioning a tube from a diaphragm to amplify the infrasound wave to the object levitating above the space between the two cylindrical magnets.

4. The method according to claim 1 further comprising disposing the two cylindrical magnets and the object in a vacuum-sealed enclosure.

5. The method according to claim 4 further comprising supporting the enclosure on flexible spindles that facilitate movement of the enclosure and the two cylindrical magnets within the enclosure based on a force of the infrasound wave.

6. The method according to claim 5 further comprising arranging a reflector to reflect and focus the infrasound wave onto the enclosure.

7. The method according to claim 5 further comprising affixing large surfaces to opposite ends of the enclosure to amplify a force of the infrasound wave on the enclosure.

8. The method according to claim 4 further comprising suspending the enclosure from flexible supports within an open-ended tube.

9. A method of performing infrasound detection, the method comprising:
   arranging two cylindrical magnets with transverse magnetization to be parallel to each other along their longitudinal axis, wherein the two cylindrical magnets have a space between them and are prevented from moving relative to one another;
   disposing a diamagnetic object to levitate above the space between the two cylindrical magnets;
   arranging a motion detector to identify relative movement between the two cylindrical magnets and the object; and
   identifying an infrasound wave based on the relative movement.

10. The method according to claim 9 further comprising positioning a funnel to direct the infrasound wave to the object levitating above the space between the two cylindrical magnets, or positioning a tube from a diaphragm to amplify the infrasound wave to the object levitating above the space between the two cylindrical magnets.

11. The method according to claim 9 further comprising disposing the two cylindrical magnets and the object in a vacuum-sealed enclosure.

12. The method according to claim 11 further comprising supporting the enclosure on flexible spindles that facilitate movement of the enclosure and the two cylindrical magnets within the enclosure based on a force of the infrasound wave.

13. The method according to claim 12 further comprising arranging a reflector to reflect and focus the infrasound wave onto the enclosure, or affixing large surfaces to opposite ends of the enclosure to amplify a force of the infrasound wave on the enclosure.

14. The method according to claim 11 further comprising suspending the enclosure from flexible supports within an open-ended tube.

15. An infrasound detection system comprising:
two cylindrical magnets with transverse magnetization arranged to be parallel to each other along their longitudinal axis with a space therebetween and supported to prevent movement relative to one another;
a diamagnetic object disposed to levitate above the space between the two cylindrical magnets; and
a motion detector to identify relative movement between the two cylindrical magnets and the object, wherein an infrasound wave is identified based on the relative movement.

16. The system according to claim 15 further comprising a funnel positioned to direct the infrasound wave to the object levitating above the space between the two cylindrical magnets, or a tube from a diaphragm positioned to amplify the infrasound wave to the object levitating above the space between the two cylindrical magnets.

17. The system according to claim 15 further comprising a vacuum-sealed enclosure enclosing the two cylindrical magnets and the object.

18. The method according to claim 17 further comprising flexible spindles that support the enclosure and facilitate movement of the enclosure and the two cylindrical magnets within the enclosure based on a force of the infrasound wave.

19. The method according to claim 18 further comprising a reflector to reflect and focus the infrasound wave onto the enclosure, or large surfaces affixed to opposite ends of the enclosure to amplify a force of the infrasound wave on the enclosure.

20. The method according to claim 17 further comprising flexible supports that suspend the enclosure within an open-ended tube.

* * * * *